United States Patent [19]

Esser et al.

[11] Patent Number: 4,951,148
[45] Date of Patent: Aug. 21, 1990

[54] CCD IMAGE SENSOR INCLUDING SMEAR SUPPRESSION MEANS

[75] Inventors: Leonard J. M. Esser; Jacobus G. C. Bakker; Marnix G. Collet, all of Eindhoven, Netherlands

[73] Assignee: U.S. Philips Corporation, New York, N.Y.

[21] Appl. No.: 282,848

[22] Filed: Dec. 9, 1988

Related U.S. Application Data

[63] Continuation of Ser. No. 121,447, Nov. 16, 1987, abandoned.

[30] Foreign Application Priority Data

Nov. 27, 1986 [NL] Netherlands .......................... 8603008

[51] Int. Cl.[5] .............................................. H04N 3/14
[52] U.S. Cl. ........................... 358/213.18; 358/213.15; 358/213.24
[58] Field of Search ...................... 358/213.15, 213.16, 358/213.19, 213.22, 213.24, 213.26

[56] References Cited

U.S. PATENT DOCUMENTS

| | | | |
|---|---|---|---|
| 4,032,976 | 6/1977 | Levine | 358/213.24 |
| 4,064,533 | 12/1977 | Lampe et al. | 358/213.26 |
| 4,178,614 | 12/1979 | Sauer | 358/213.26 |
| 4,490,744 | 12/1984 | Levine | 358/213.24 |
| 4,584,609 | 4/1986 | Klein et al. | 358/213.15 |
| 4,731,656 | 3/1988 | Dischert et al. | 358/213.25 |

FOREIGN PATENT DOCUMENTS

| | | |
|---|---|---|
| 0128615 | 12/1984 | European Pat. Off. . |
| 0159758 | 10/1985 | European Pat. Off. . |
| 0161023 | 11/1985 | European Pat. Off. . |
| 59-99882 | 8/1984 | Japan . |

OTHER PUBLICATIONS

"The Accordion Imager: An Ultra High Density Frame Transfer CCD" from the Technical Digest of the International Electron Devices meeting 1984, pp. 40-43.
"Solid State Image Sensors" from Solid State Devices, 1985 Invited Papers Presented at European Solid State Device Research Conference Sep. 1985, pp. 183-200.

Primary Examiner—Jin F. Ng
Assistant Examiner—Stephen Brinich
Attorney, Agent, or Firm—Bernard Tiegerman; William L. Botjer

[57] ABSTRACT

In a CCD image sensor arrangement, during the transport through the CCD channels the distance between successive signal packets is enlarged and an empty potential well is induced between these packets, which is then transferred as a normal packet together with the signal charges. During the transport, in the said additional well charge is collected which is representative for the smear charge which is trapped during the transport by the corresponding signal packet. When during reading, the smear charge is subtracted from the signal charge, the accurate value of the smear-compensated signals can be determined.

21 Claims, 10 Drawing Sheets

CCD IMAGE SENSOR INCLUDING SMEAR SUPPRESSION MEANS

This is a continuation of application Ser. No. 121,447, filed Nov. 16, 1987 now abandoned.

BACKGROUND OF THE INVENTION

The invention relates to a CCD image sensor arrangement having a semiconductor body comprising a charge-coupled device of a type in which there is transported between two successive signal charge packets which are representative of the local intensity of a trapped image a reference charge packet through the charge transport channel of the charge-coupled device which is representative of the overall smear charge and dark-current charge which is collected during the said charge transport.

CCD image sensor arrangements can be subdivided into a number of types. The best known types are the interline sensor and the frame transfer sensor. The interline sensor comprises a number of columns of photosensitive elements (pixels) in which the collected image can be converted during an integration period into charge packets, whose size corresponds to the local intensity of the collected image. Between the columns are arranged charge-coupled devices in which the charge-packets can be transported in vertical direction to a horizontal read-out register. Mostly, the charge-coupled devices are shielded against incident radiation by an opaque or a reflecting layer.

Image sensor arrangements of the frame transfer type mainly comprise only a large number of adjacent charge-coupled devices which are divided in the longitudinal direction into an image sensor section and a storage section. The image is projected onto the image sensor section and is converted into a pattern of charge packets, which after the integration period are rapidly transported to the storage section and are read out linewise by means of a horizontal read-out register.

Besides the types of image sensor arrangements mentioned here, there are other known types of CCD image sensor arrangements, such as, for example, image sensor arrangements of the line transfer type, to which apply the problems mentioned below and the solutions proposed in accordance with the invention.

A known problem which may arise in charge-coupled image sensors is the so-called smear, which can become manifest during the display by a vertical pattern of stripes in the image. This smear is due to the transport in the charge-coupled devices. During the transport, the charge packets pass the other image points in the same column and each time collect some charge, which is generated at or near these image points. This effect may even result in that, if locally the intensity is very high, a whole column becomes white during display.

A CCD image sensor arrangement of the kind described in the opening paragraph, in which the smear problem is solved for the most part with moving images, is known inter alia from Japanese Patent Application 208299/82 filed on Nov. 11, 1982, which has been laid open to public inspection on June 8, 1984 under Kokai No. 99882/84.

In this prepublished Application, a CCD sensor of the interline type is described, in which two charge-coupled devices are present between two adjacent columns of image points, the pixels in a column being alternately coupled to the two charge-coupled devices on either side of the column. Per charge-coupled device the number of stages, to be considered as a group of electrodes that can comprise one charge packet, is about twice the number of pixels which is associated with this charge-coupled device. As a result, it is possible to transport between the potential wells containing signal charge each time an "empty" potential well through the charge transport channel. The inverted commas for the word empty are provided to indicate that these potential wells do not contain signal charge and are "empty" only in that sense. During the charge transport, these "empty" potential wells pass the same locations as the potential wells which do contain signal charge and therefore collect the same smear charge as the signal charges. When now these smear charges are substracted from the charge packets stored in the potential wells containing signal charge, the signal charges can accurately be determined.

This known method can be used in interline sensors, but cannot be used in the sensors of the frame transfer type described above because in the latter type of sensors the charge-coupled devices constitute at the same time the photosensitive elements, in which the trapped radiation is converted during the integration period into electrical charge.

A further disadvantage of the known method is that the method of generating the smear charged proposed here requires each time an additional stage in the vertical charge-coupled devices, which occupies additional space on the semiconductor crystal and/or which renders it difficult to increase the number of pixels per unit length in the column direction and/or row direction.

SUMMARY OF THE INVENTION

The invention has inter alia for its object to provide for a CCD image sensor of the kind mentioned in the opening paragraph a method of generating a reference charge packet representative of the smear effect, which can be used not only for sensors of the interline type, but also for sensors of the frame transfer type. The invention further has inter alia for its object to provide a method of generating a charge packet representative of the smear effect, which does not or substantially not require additional space in the photosensitive part of the image sensor arrangement. The invention is based inter alia on the recognition of the fact that the additional potential wells for the reference charges are required only during the charge transport and are therefore not required during the integration period and that between two successive signal charges immediately before or during the charge transport an additional well for the reference charge can be induced by enlarging the distances between the signal charges.

A CCD image sensor arrangement of the kind described in the opening paragraph is characterized according to the invention in that means are provided, with the aid of which there are induced before the said charge transport in the channel two potential wells which are separated from each other by a potential barrier and in which the two said signal charge packets are stored, and with the aid of which then at the beginning of the charge transport the distance between the signal charge packets is enlarged by displacing at least one of these signal charge packets, and with the aid of which there is induced between these signal charge packets a third potential well which is also transported during the charge transport, the reference charge packet then being formed.

In a CCD image sensor according to the invention, the number of CCD stages is essentially determined by the number of pixels per column. Due to the fact that the reference charge packet does not require an additional CCD stage, at least does not require such a stage in the photosensitive part of the arrangement, the invention is particularly suitable for smear compensation in CCD sensors of the frame transfer type.

An important preferred embodiment, which has the advantage that the influence of smear charge and dark-current charge already present in the charge-coupled devices before the formation of signal charges can be practically entirely eliminated, is characterized in that further means are provided, with the aid of which, after all signal charges have been removed from the charge-coupled device or a part thereof, the remaining charges due to leakage current and/or smear collected in this part are drained before signal charges of a next frame are collected in the charge-coupled device.

An important class of CCD image sensors, in the literature also designated as accordion sensors, is described inter alia in the publication "The Accordion Imager: An Ultra High Density Frame Transfer CCD" by A. J. P. Theuwissen et al, published in Techn. Digest of the International Electron Devices Meeting 1984, p. 40/43 and in the European Patent Applications in the name of the Applicant 0128615, 0161023 and 0159758 laid open to public inspection. In these known arrangements, during the charge transport, the distance between two successive charge packets is also enlarged. However, this has for its object, in deviation from the present invention, to increase the density of photosensitive elements (pixel density) to a greater extent than is essentially allowed with the phase number of the transport.

Thus, in a frame transfer sensor, the image sensor section can be operated during the integration period as a 2-phase CCD, at every other electrode a signal packet being formed, while during the charge transport the arrangement is operated as a 4-phase system, one charge packet occurring per four electrodes. By means of the accordion principle, it is possible, whilst avoiding signal mixing, to transport the signal charges with the aid of 4-phase transport and to record the image with the aid of the 2-phase mode of operation. As a result, with respect to the normal 4-phase transport a doubling of the pixel density can be obtained. In an analogous manner, the charge can be transported according to the 4-phase mode and can be stored therein according to the 2-phase mode.

In these known arrangements, the signal charges are displaced only over such a distance from each other that the number of electrodes between two successive signal charges corresponds to the number of phases of the charge transport. A solution of the smear problem is not given in the aforementioned publications.

An important preferred embodiment, which combines the advantage of the accordion sensor with the advantage of smear suppression, is characterized according to the invention in that the charge-coupled device is of the type which is operated during the storage of signal charges as an m-phase device and is operated during the charge transport as an n-phase device, n being larger than m, while during the transport, in order to avoid mixing of charge packets, in a series of charge packets a charge packet always participates in the transport later than the preceding charge packet, that is to say only then when it distance from the preceding charge packet is sufficiently large, this distance between at least two successive signal charges being made so large that between these signal charges the said third potential well can be induced, in which the reference charge is formed, and that the distance between the foremost signal charge and the reference charge and between the reference charge and the following signal charge has first to be made sufficiently large before the last-mentioned signal charge is transported.

BRIEF DESCRIPTION OF THE DRAWINGS

The invention will be described more fully with reference to a few embodiments and the accompanying diagrammatic drawing, in which.

DETAILED DESCRIPTION OF THE PREFERRED EMBODIMENTS

The principle of the invention will first be described with reference to FIG. 1, which illustrates different stages during the operation of a CCD image sensor arrangement 1 according to the invention.

Figure 1:
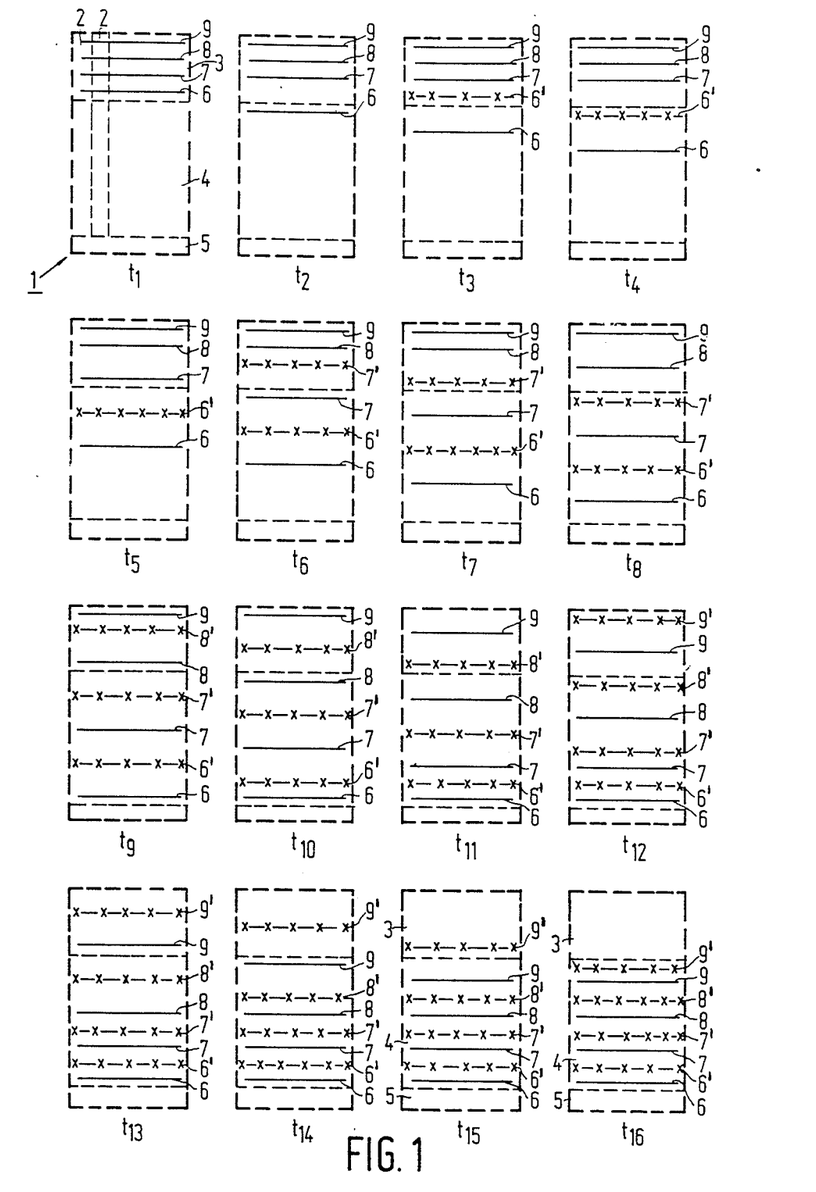
FIG. 1 shows a diagrammatic representation of an FT sensor according to the invention at a number of instants during operation.

The image sensor arrangement is, by way of example, of the frame transfer type (FT sensor) comprising a number of parallel and adjacent vertical charge-coupled devices 2, of which only two are shown in FIG. 1 ($t_1$). As usual, the arrangement comprises three sections to be distinguished, i.e. the image sensor section 3, in which the image is projected and converted into a charge pattern; the storage section 4, in which the generated charge pattern is stored, and the horizontal read-out register 5, by means of which the information stored can be read out linewise. The contours of the three sections are indicated, like the contours of the charge-coupled devices 2, by broken lines. At the instant $t_1$, the situation is shown in which an image is converted into a charge pattern and the storage section 4 is completely empty. The arrangement shown in the drawing comprises for the sake of clarity only four image lines 6–9 indicated by full lines. In practical embodiments, this number will be considerably larger, however.

It is assumed that the arrangement is operated according to the accordion principle already described above, while during the integration at least the image sensor section 3 is operated as an m-phase device and is operated during the transport as an n-phase device, n being larger than m. As will appear from the description, however, this is not necessary and the invention may also be used in an arrangement which is operated both during the charge storage (integration) and during the transport as an n-phase arrangement. At $t_2$, the lowermost image line, i.e. the image line 6, is displaced and has arrived in the storage section 4. The image lines 7, 8 and 9 have not changed their places so that the distance between the image lines 6 and 7 is enlarged. In known CCD sensors of the accordion type, at the following transport stage the line 7 would be displaced simultaneously with the line 6. In the sensor according to the invention, however, (FIG. 1-instant $t_3$) the image line 6 is displaced further by a CCD stage corresponding to n-phase transport, while the lines 6–9 remain in place and between the lines 6 and 7 a line 6' of new potential wells is generated. In the drawing, this line is indicated by a dash-and-cross line. Preferably, the line 6' is induced at the area of the image line 6 in the integration period. At a next stage ($t_4$), the image line 6 and the line 6' serving as reference for the line 6 are displaced simultaneously by means of n-phase transport. If the distance between the lines 6' and 7 is sufficiently large, the image line 7 is also displaced simultaneously with the line 6' and 6 ($t_5$), while the lines 8 and 9 remain in place. At $t_6$, the image line 7 is spaced by an n-phase CCD stage from its original integration location and a line 7' of potential wells is induced between the lines 7 and 8 at the original location of the image line 7 on behalf of the formation of reference charges for the image line 7. At $t_7$, the situation is shown in which the lines 6,6',7,7' are transported, while the image lines 8 and 9 still remain in place. At $t_8$, the image line 8 also participates in the transport, whereupon ($t_9$) the reference line 8' can be induced. At $t_9$, the first image line 6 has also arrived at the lowermost storage line in the image storage 4 and will not be transported further for the time being. At $t_{10}$, the reference line 6' has arrived at the last storage line but one of the image storage and will remain stored there for the time being. At $t_{11}$, the last image line 9 also participates in the transport, after which ($t_{12}$) the reference line 9' can be induced. In the same manner as described above for the lines 6,6' etc. the remaining lines are introduced into the image storage. At $t_{16}$, all image lines 6–9 with their reference lines 6'–9' have been introduced into the image storage 4.

Since a reference line is associated with each image line, the storage capacity of the image storage is twice that of the sensor section 3. Due to the fact that each reference line 6', 7', 8', 9' has covered the same or at least substantially the same path in the image sensor section as the image line with which it is associated, the smear charge in the reference line will be substantially equally large as the smear charge collected by the image line during the transport from the image sensor section to the storage section. Therefore, by subtracting during reading from each image signal from the image lines 6,7,8 etc. the corresponding smear signal from the reference lines 6', 7', 8', 9' etc., a signal can be obtained which gives accurate information about the local brightness of the image and is not disturbed by smear and/or dark current during the transport stage.

It should be noted that the reference lines 6', 7' etc. occupy additional space in the storage section 4, it is true, but do not influence the pixel density in the image sensor section 3 and do not influence the resolution in vertical direction either.

Figure 2A:
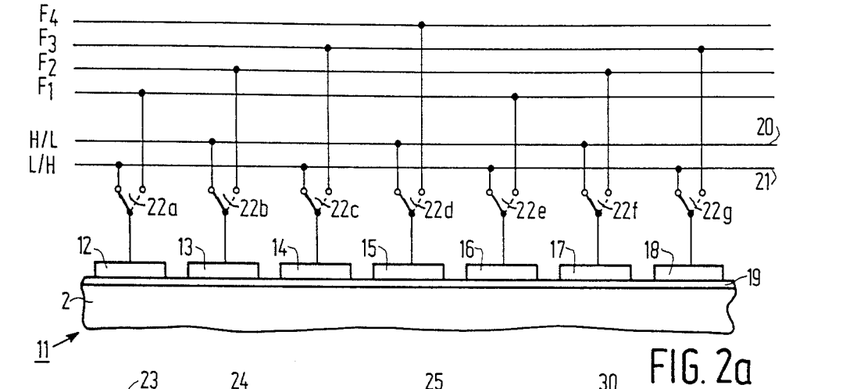
FIG. 2a is a sectional view of a part of the sensor section.

FIG. 2a shows diagrammatically an embodiment of a charge-coupled device according to the invention. The drawing shows in sectional view a part of the sensor section 3 with a CCD channel 2 defined in a semiconductor body 11. It is assumed that the arrangement is of the n-channel type, so of the type in which the information is composed of packets of electrons. However, it will be appreciated without further explanation that the invention may also be used for arrangements of the p-channel type. The arrangement may be both of the buried channel type (BCCD) or of the type with surface channel (SCCD). It is assumed that the charge transport takes place directly. The surface of the semiconductor body is provided with a system of clock electrodes 12–18, of which only seven are shown in the drawing, but of which the real number will be considerably larger. These electrodes can be arranged by any known method according to a mono- or multilayer technology so that they overlap or do not overlap each other. A thin oxide layer serving as gate dielectric is disposed between the electrodes and the surface of the semiconductor body. The drawing shows diagrammatically four clock lines, to which clock voltages $F_1$, $F_2$, $F_3$ and $F_4$ are applied for 4-phase transport. The clock lines will be designated hereinafter for the sake of simplicity by $F_1$, $F_2$, $F_3$ and $F_4$. Further, the drawing shows two lines 20 and 21, to which a voltage at the high level H and/or a voltage at the low level L can be applied. It is assumed that, when the voltage H is applied to one of the lines 20, 21, the voltage L is simultaneously applied to the other line, and conversely. This is indicated in the drawing by H/L at line 20 and L/H at line 21. The electrodes 12–18 are connected to respective switches 22a, 22b, 22c etc., by means of which each of the electrodes can be connected either to one of the clock lines $F_1$, $F_2$, $F_3$, $F_4$ or to one of the lines 20 and 21. The connections between the switches 22 and the lines 20 or 21 are such that each time two adjacent electrodes are connected to different lines 20,21.

Figure 2B:
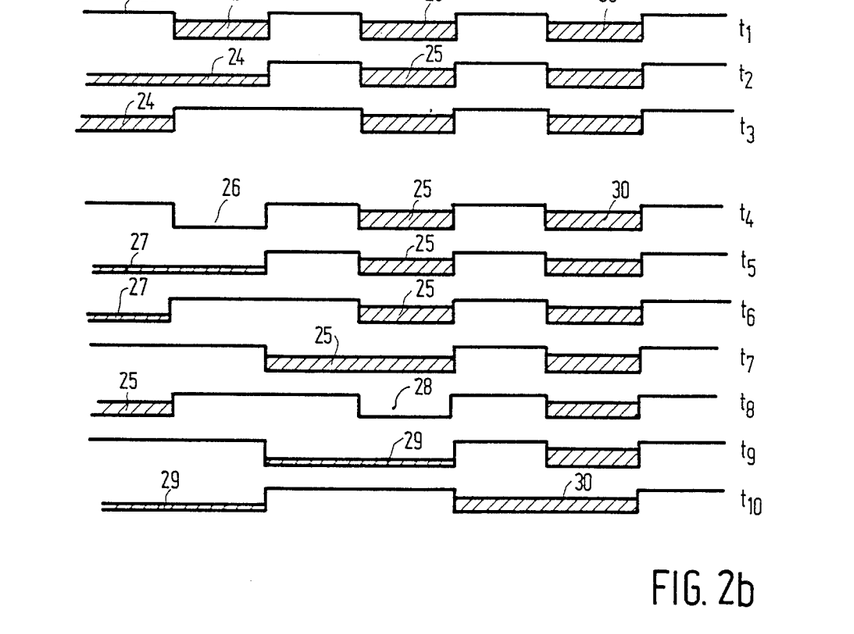
FIG. 2b shows the potential distribution in this part at different instants during operation.

For the operation of the arrangement, use is made of principles described, for example, in the aforementioned EP-A 0,128,615 laid open to public inspection. For explanation of the invention, FIG. 2b shows the potential profiles at ten different instants $t_1$–$t_{10}$ during operation, the positive potential being plotted in downward direction.

During the integration period in which a radiation image is converted into a charge pattern, the electrodes are applied to a fixed potential, the voltage L being applied to the electrode 12, the voltage H being applied to the electrode 13, again the voltage L being applied to the electrode 14, etc. In the semiconductor body a potential profile as shown in FIG. 2b, $t_1$, is formed with barriers 23 below the even-numbered electrodes and potential wells 24 below the odd-numbered electrodes. Photo-currents generated in the semiconductor body can be integrated in the potential wells 24, as a result of which charge packets are formed in the wells, whose size corresponds to the local luminous intensity. The charge packets are indicated in the drawing by the cross-hatched lines. It should be noted that the charge packets are stored at every other electrode. Each picture element (pixel) therefore corresponds to two electrodes, which means a doubling of pixel density as compared with arrangements operated in the usual manner with 4-phase transport. This doubling of the pixel density is obtained due to the accordion principle described inter alia in the aforementioned Application EP 0,128,615 and in the article "Solid Stage Image Sensors" by M. G. Collet, published in Solid State Devices, 1985, Invited Papers Presented at the fifteenth European Solid State Device Research Conference, Aachen, September 1985, p. 183/200, more particularly FIG. 10 with associated description.

In order to transport the stored charge, by changeover of the switches 22a and 22b, first the clock electrodes 12 and 13 are connected to the clock lines $F_1$, $F_2$, as a result of which the charge packet 24 is displaced. In FIG. 2b, this is shown by the potential distributions at $t_2$ and $t_3$. The distance between the charge packet 24 and the charge packet 25 stored in the next potential well is now so large that according to the known accordion mode of operation the charge packet 25 could also be transported without the packets 24 and 25 being mixed with each other. However, according to the invention, the switches 22c and 22d remain in their original states for the time being, as a result of which the voltages at the electrodes 14,15 do not vary and the charge packet 25 does not participate in the charge transport for the time being. In this situation, under the influence of the 4-phase clocks $F_1 \ldots F_4$, a new potential well 26 is induced below the electrode 13 ($t_4$) (FIG. 2b). During the subsequent charge transport, this potential well is displaced to the left, some charge 27 being collected gradually, which is a measure for the smear charge collected during the transport of the packet 24 (cf. FIG. 2b, $t_5$). When the distance from the packet 25 is sufficiently large, the switches 22c, 22d can be changed over, as a result of which the electrodes 14,15 are connected to the clock lines $F_3$ and $F_4$, respectively. The charge packet 25 can now also be transported synchronously with the packets 24 and 27. (FIG. 2b, $t_7, t_8$). At the location at which the packet 25 was originally stored, again a potential well 28 can be induced. During the subsequent transport, the reference charge 29 ($t_9, t_{10}$) is collected therein. The size of the packet 29 is not necessarily equal to that of the packet 27 because the charge packet 29 has to cover a different, especially longer path than the packet 27. At $t_{10}$, as shown in FIG. 2b, the last signal charge packet 30 can also participate in the charge transport.

The signal charges and the reference charges can be transported in the manner described here from the image sensor section to the storage section. The charge storage in the storage section can again take place according to the 2-phase mode, as described inter alia in the aforementioned publications.

Figure 3:
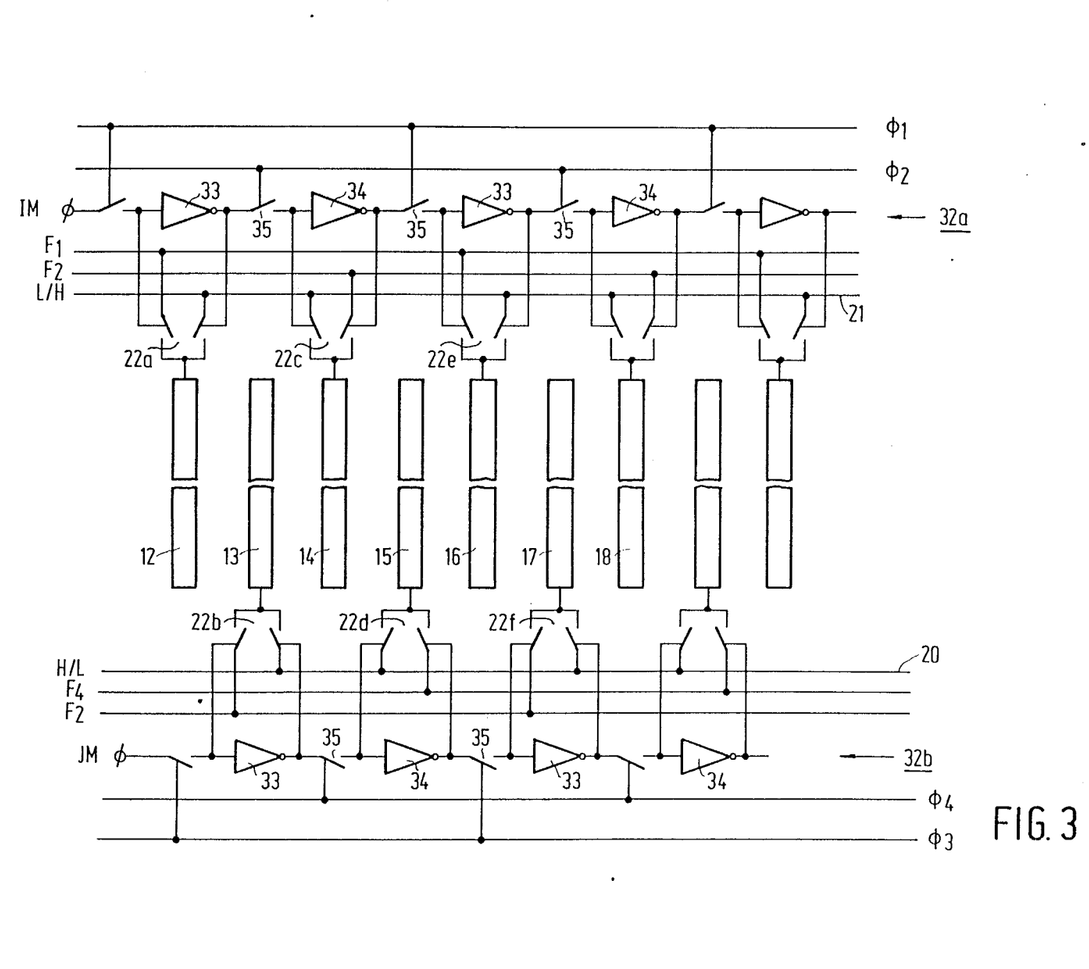
FIG. 3 shows a circuit diagram of this arrangement.

FIG. 3 shows the block circuit diagram of an embodiment of the arrangement according to the invention. In the drawing, the clock electrodes 12-18 and the associated switches 22a, 22b, 22c etc. are shown only diagrammatically, which connect the electrodes either to one of the clock lines $F_1$-$F_4$ or to one of the lines H/L or L/H, to which a fixed voltage is applied at least during a cycle. The switches 22 are driven by a shift register 32, of which successive stages are connected to the switches 22. In the present embodiment, the shift register is subdivided into two parts 32a and 32b, of which the part 32a, which is associated with the even-numbered electrodes, is provided on one side of the sensor, while the part 32b, which is associated with the odd-numbered electrodes 13, 15, 17 etc., is provided on the other side of the sensor. As a matter of course, embodiments comprising a single shift register 32 are also possible, but the present embodiment comprising a shift register or a part of a shift register on either side of the matrix has great advantages in designing the arrangement. To the input terminals of the shift registers 32a, 32b are supplied input signals IM, which under control of the clock voltages $\phi_1$, $\phi_2$, $\phi_3$, $\phi_4$ are passed through the shift registers from the left to the right. The shift registers 32a, 32b comprise a series of inverter stages 33, 34, which are interconnected through switches 35, which are controlled by the clocks $\phi_1$-$\phi_4$. The inverter stages are connected in such a manner to the switches 22a, 22b, 22c, 22d, etc. that, when the inputs of the inverter circuits 33 or the outputs of the inverter circuits 34 are high, the associated clock electrodes are connected to one of the clock lines $F_1$-$F_4$ and that, when the outputs of the inverter circuits 33 or the inputs of the inverter circuits 34 are high, the associated clock electrodes are connected to the d.c. voltage L/H.

Figures 5, 6, 7:
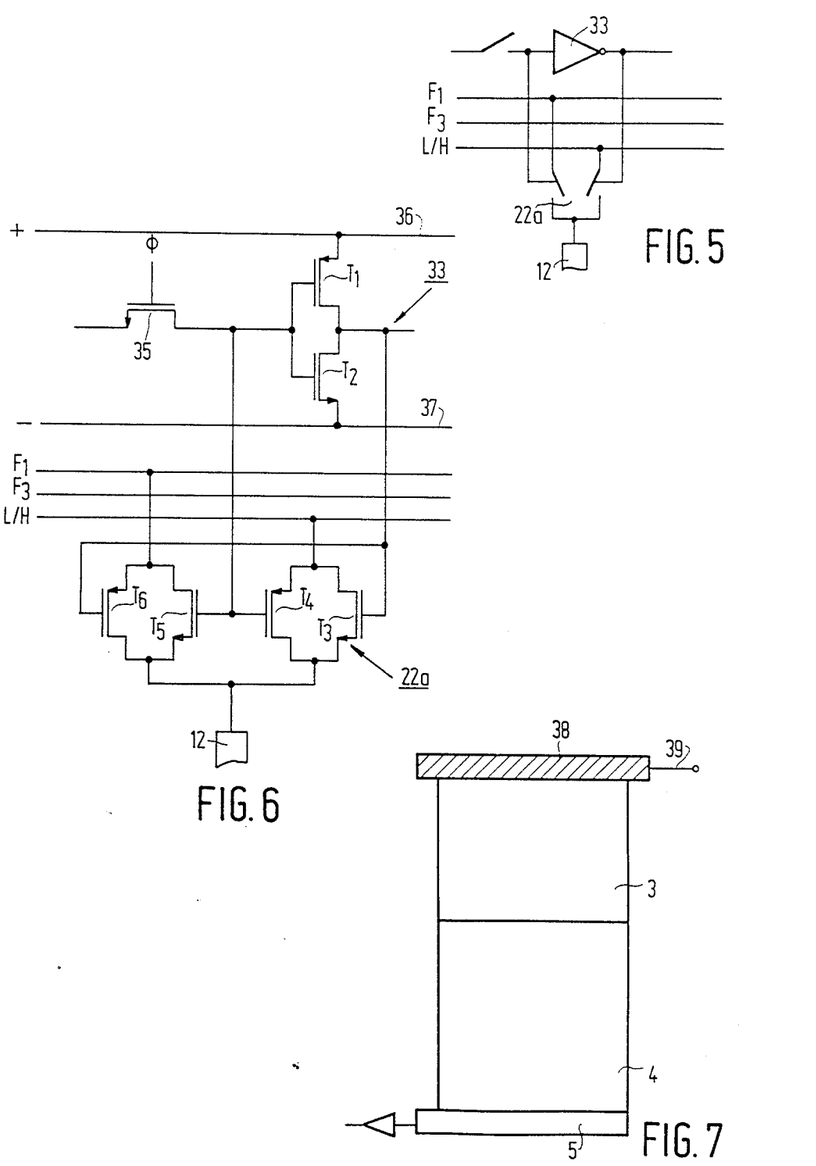
FIG. 5 shows the block circuit diagram of a stage of the shift register used in this arrangement and the associated switch.
FIG. 6 shows the circuit diagram of an embodiment associated with FIG. 5.
FIG. 7 shows the block circuit diagram of a second embodiment of an FT sensor according to the invention.

FIG. 5 shows the circuit diagram of one stage of the shift register 32a with the associated clock electrode 12, while FIG. 6 shows a possible embodiment of the associated circuit. The inverter 33 is of a usual construction comprising a series-combination of a p-channel MOS transistor $T_1$ and an n-channel transistor $T_2$ between two supply lines 36, 37, which are connected to a high voltage $+$ and a low voltage $-$. The gate electrodes of $T_1$ and $T_2$ are connected in common to a main electrode region of the switch 35, which can simply be constituted by an n-channel MOS transistor. The switch 22a comprises two n-channel MOS transistors $T_3$ and $T_5$ and two p-channel MOS transistors $T_4$ and $T_6$. The gates of the transistors $T_4$ and $T_5$ are connected to the input of the inverter 33; the gates of the transistors $T_3$ and $T_6$ are connected to the output of the inverter 33. The operation of the circuit shown in FIG. 6 is as follows. When the input of the inverter stage 33 is high and therefore the output of the stage 33 is at the same time low, the transistors $T_5$ and $T_6$ are conducting and the transistors $T_3$ and $T_4$ are non-conducting. The clock electrode 12 is then connected through the conducting transistors $T_5, T_6$ to the clock line $F_1$. In the other case, the input and the output of the inverter stage 33 are low and high, respectively. In this condition, the transistors $T_3$, $T_4$ are conducting and the transistors $T_5$ and $T_6$ are non-conducting, as a result of which the clock electrode 12 is connected to the d.c. line L/H.

Figure 4A:
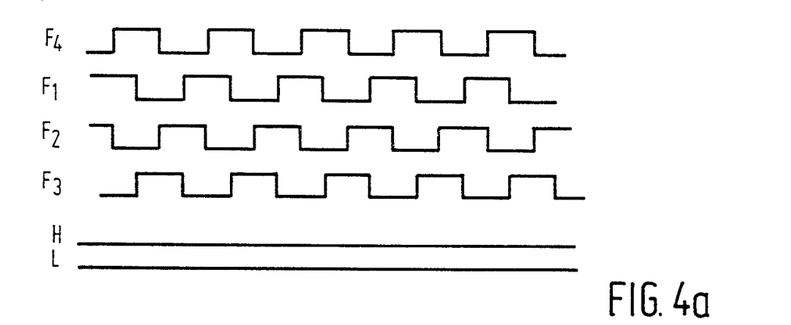
FIGS. 4a and 4b shows clock voltages applied during operation as a function of the time t.
Figure 4B:
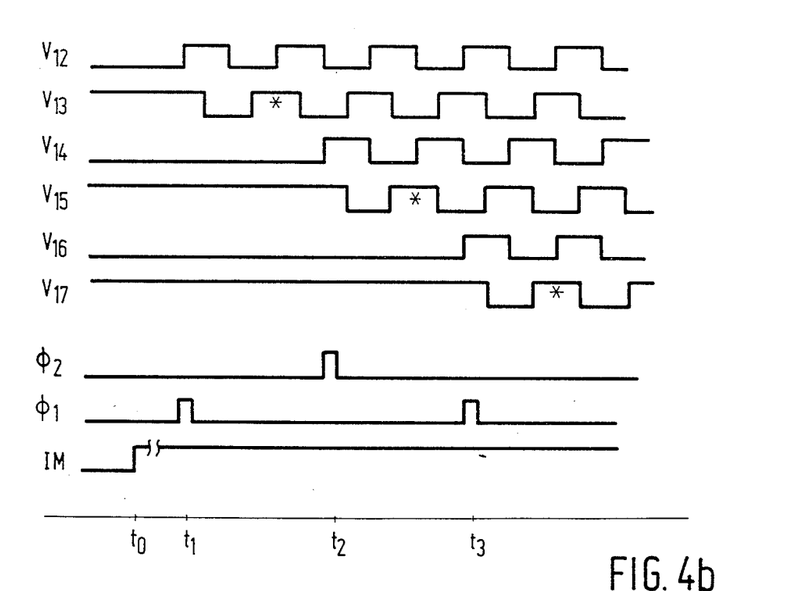

For explanation of the operation of the circuit shown in FIG. 3, in FIG. 4a the clock voltages $F_1$-$F_4$ and the voltages L and H are shown as a function of time, while in FIG. 4b the clocks $\phi_1$ and $\phi_2$, the input signal IM of the shift registers 32 and the voltages $V_{12}$-$V_{17}$ are shown as a function of the time t. It is assumed that $\phi_1 = \phi_3$ and $\phi_2 = \phi_4$. The clocks $F_1$-$F_4$ are usual 4-phase clock voltages with an overlap of 90°. The starting point is the situation during the integration period in which the electrodes 12, 14, 16 etc. are at the low voltage level L and the odd-numbered electrodes are at the high voltage level H. Below these electrodes potential wells are formed, in which signal charges are integrated, while below the even-numbered electrodes potential barriers are present, which separate the signal charges from each other. The inputs of the inverter circuits 33 are at the low voltage level L and the outputs are at the high voltage level H in this situation. On the contrary, the inputs of the inverter circuits 34 are H and their outputs are L. At $t_0$ (FIG. 4b), IM passes from L to H. At $t_1$, when $\phi_1 (=\phi_3)$ is high, this input signal is passed on to the inputs of the first inverter stages 33 of the shift registers 32a and 32b. The outputs of these inverter stages then become L, the clock electrodes 12 and 13 being connected to the clock lines $F_1$ and $F_2$. The signal integrated below the clock electrode 13 is transported to the region below the clock electrode 12 at the instant at which the clock electrode 13 becomes low (L). Subsequently, $V_{13}$ again becomes H (indicated by an asterisk in FIG. 4b), as a result of which below the clock electrode 13 the additional potential well is generated for collecting the smear charge. It is not until this potential well had been further "transported" to the semiconductor region below the clock electrode 12 and/or the semiconductor region located on the lefthand side thereof that $\phi_2$ is pulsed ($t_2$). The states of the inputs and the outputs of the inverter circuits 34 are changed, as a result of which the clock electrodes 14 and 15 are connected to the clock voltages $F_3$ and $F_4$, respectively. When the signal integrated below the clock electrode 15 has been removed, in situ again a new potential well is formed for generating the reference signal during the positive voltage pulse $V_{15}$, which is indicated in FIG. 4b again with an asterisk.

When this potential well has been shifted on, the electrodes 16,17 can be connected to the clock lines $F_1$ and $F_2$, respectively, by means of the pulse $\phi_1$ at $t_3$, which ensures that the states of the in- and outputs of the next inverter circuit 33 are changed. Thus, the whole pattern of signal charges and reference charges stored in the sensor section can be transported by means of 4-phase clocks to the storage section and can be stored there according to the 2-phase mode. When the sensor section is completely empty, it can be made ready for a next frame. For this purpose, again the input signal IM=0 can be supplied again to the inputs IM of the shift registers 32a, 32b, which signal is shifted by means of the clocks $\phi$ (which now need not necessarily have the same frequency as during the preceding charge transport) through the shift register until the shift registers 32a,b are again in the same state as before the charge transport described here. The clock electrodes 12-17 are then connected again to the d.c. lines 20,21. In the case in which again the levels H and L, respectively, are applied to these lines, the pixels are the same as in the preceding frame. However, preferably, for the second frame the low level L and the high level H are applied to the lines 20 and 21, respectively, as a result of which barriers are now formed below the odd-numbered electrodes and below the even-numbered electrodes potential wells are formed, in which the photocurrents are integrated. With respect to the first frame, the pixels have now been shifted over half a pitch, as a result of which the number of lines can be doubled (interlacing). During the transport, it is then required that $\phi_1 = \phi_4$ and $\phi_2 = \phi_3$.

Figure 8:
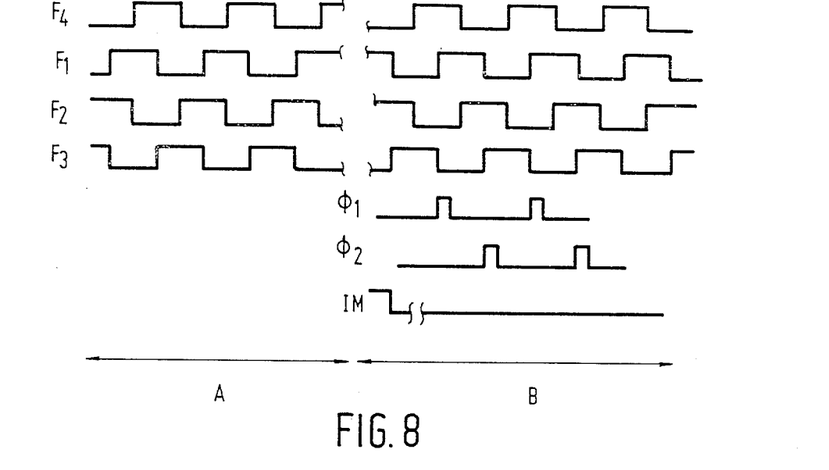
FIG. 8 shows clock voltages to be applied to this arrangement as a function of the time t.

Preferably, the potential wells are emptied before a frame is recorded because during the charge transport described above smear charge could have formed again. A first method of removing this current charge consists in that a negative voltage pulse is applied to the lines 20 and 21, as the case may be in conjunction with a variation of the substrate potential, as a result of which any charge collected in the substrate disappears. Another method of removing this charge will be described with reference to FIGS. 7 and 8. FIG. 7 shows diagrammatically the image sensor of the kind described above comprising the image sensor section 3, the storage section 4 and the horizontal read-out register 5. On the upper side of the sensor section 3, i.e. on the side remote from the storage section, an n-type drain zone 38 is formed, which is provided with a connection 39 for applying a suitable voltage for draining electrons. For the operation of the arrangement, the fact is utilized that in the 4-phase arrangement described here, no inner potential barriers determining the charge transport direction are built in so that it is possible to cause the direction of the charge transport to be changed. For explanation of the operation, FIG. 8 shows the clock diagrams. In the time interval A, the clock voltages $F_1-F_4$ during the transport are indicated, which, as has been described with reference to FIGS. 3 and 4a, are such that a charge pattern stored in the image sensor section 3 is transported to the storage section 4, the positive pulses being applied in time in the oreder of succession $F_4$, $F_3$, $F_2$, $F_1$ etc. When the whole charge pattern has been shifted on and has been stored together with the reference charges in the storage section, the order of succession of the clocks is reversed, as is shown in FIG. 8 in the time interval B.

The positive pulses now occur in the order of succession $F_1$, $F_2$, $F_3$, $F_4$ etc. The interference charges, which have formed in the sensor section during the transport of the signal charges to the storage section, are now transported upwards to the drain zone 38. Due to the fact that the input signal IM-0 is also supplied to the shift registers 32a,32b, which signal is gradually shifted through the shift registers 32a by means of the clocks $\phi_1,\phi_2$, the clock electrodes 12,13; 14,15 etc. are sequentially connected to the d.c. lines 20,21. From that instant, no smear charge will be collected any longer below the electrodes. When the last clock electrode, which is closest to the drain 38, is also connected to one of the d.c. lines 20,21, the sensor section is entirely free from smear charge and is ready for the next frame.

According to this method, the pixels in a column, starting with the pixel on the lower side of the sensor section, will begin in order of succession with the integration stage for the next frame. This time difference can be compensated for by the time difference obtained during the frame transport according to the principle described here if the clocks $\phi_1,\phi_2$ are adapted for this purpose.

Figure 9:
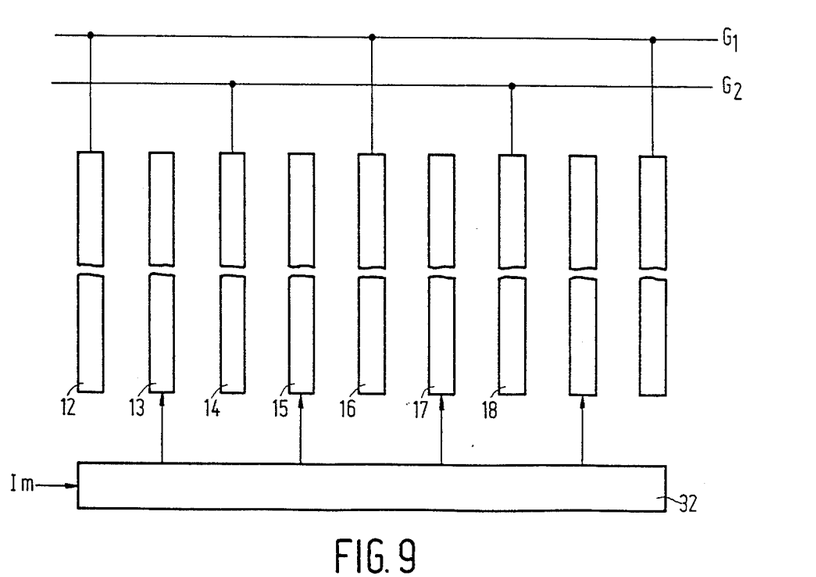
FIG. 9 shows diagrammatically a further embodiment of a sensor according to the invention.
Figure 10A:
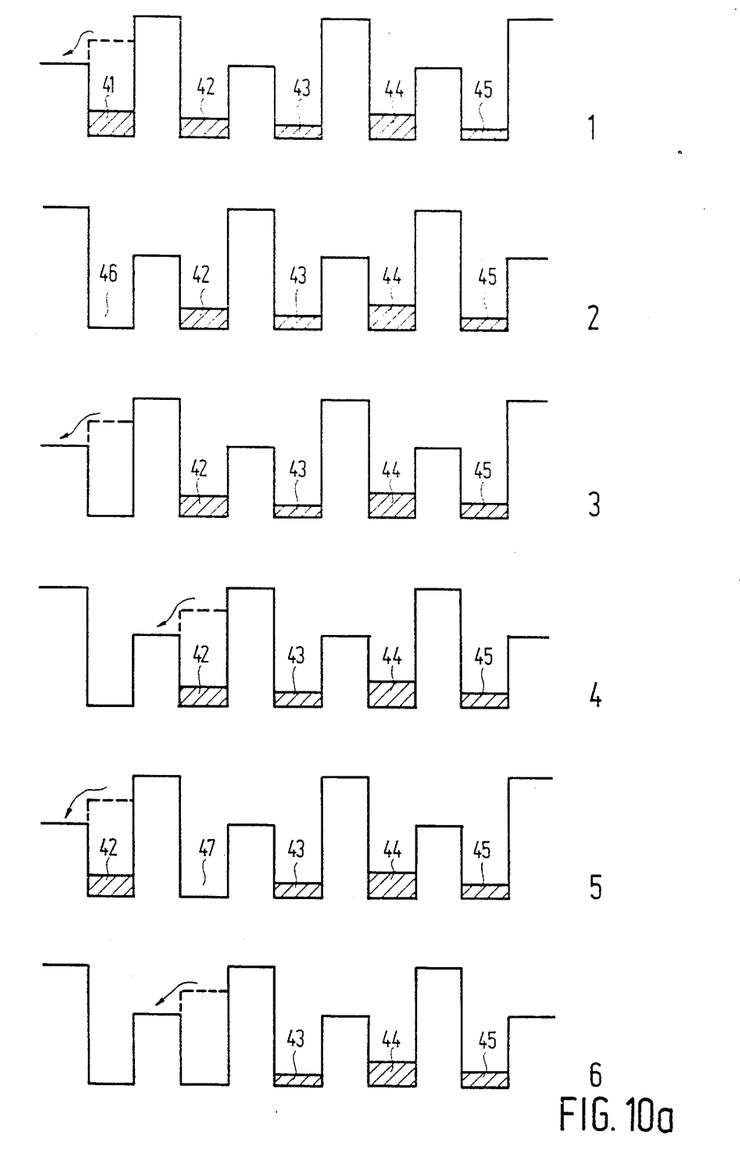
FIGS. 10a and 10b shows potential distributions occurring in this sensor at a number of instants during operation.
Figure 11A:
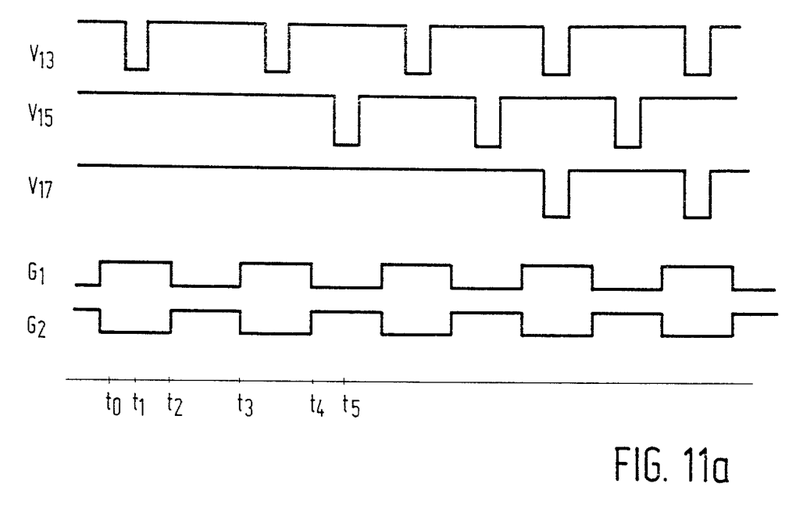
FIGS. 11a and 11b shows voltages to be applied to this arrangement as a function of the time t.

FIG. 9 shows diagrammatically a modification of an arrangement as shown in FIG. 7. The drawing again shows diagrammatically a number of electrodes 12,13,14,15 etc. In contrast with the embodiment shown in FIG. 3, now only the odd-numbered clock electrodes are driven by a shift register 32. The clock electrodes 12,14 etc., so the even-numbered electrodes, are alternately connected to clock lines $G_1$ and $G_2$. It should be noted that a charge-coupled device with such a combined drive forms the subject matter of the co-pending Netherlands Patent Application "Charge-coupled device" (PHN.11950) in the name of the Applicant. The operation of the arrangement will be explained with reference to FIGS. 10 and 11. FIG. 10a shows potential diagrams at a number of instants at which after the end of an integration period the generated signal charges are transported to the storage section not shown in FIG. 9. FIG. 11a shows the associated clock voltages $V_{13}$, $V_{15}$, $V_{17}$ etc. and the clock voltages $G_1$ and $G_2$ as a function of the time t. It is assumed that the integrating gates are formed during the integration period by the clock electrodes 13,15,17 etc., which are kept at a positive voltage level. The clocks $G_1$ and $G_2$ vary between two levels which are both lower than the said d.c. level at the electrodes 13,15,17. FIG. 10a,1 indicates by a full line the situation at the instant $t_0$ (FIG. 11a). Below the electrodes 13,15,17 signal charges 41,42,43 etc. are stored. The associated potential wells are limited on both sides by potential barriers of different heights corresponding to the clocks $G_1$ and $G_2$. At $t_1$, $V_{13}$ falls to a low level, as a result of which the (negative) potential level below the electrode 13 rises to the level indicated by a dotted line in FIG. 10a,1. The low level $V_{13}$ is chosen between the high and the low level of the clocks $G_1$ and $G_2$, as a result of which the charge 41 flows over the low barrier below the clock electrode 12 to the left to a potential well not shown in the Figure. The transport to the right is prevented by the higher potential barrier below the clock electrode 14. $V_{13}$ then returns to the original high level, after which $G_1$ becomes low and $G_2$ becomes high. ($t_2$). The associated potential diagram is shown in FIG. 10a,2. In this situation, the charge packet 42 could be transferred to the adjacent low potential well 46. However, according to the invention, the signal packet 42 remains a clock period $G_1,G_2$ longer stored below the electrode 15. The "empty" tank 46 is transported to the left at $t_3$ (cf. FIG. 10a,3), in the same manner as the charge packet 41. In the same manner as described with reference to the preceding embodiments, the smear charge, which is also formed in the charge packet 41 during the charge transport, is integrated in the "empty" tank 46. At $t_4$, $G_1$ and $G_2$ pass to the low and the high level, respectively. The associated potential profile is indicated by a full line in FIG. 10a,4. At $t_5$, $V_{15}$ falls to the low level, as a result of which the level of the potential well below the clock electrode 15 is increased. This level is indicated by broken lines in FIG. 10a,4. The charge packet 42 stored below the electrode 15 is transported to the left to the preceding empty potential well below the electrode 13. In a next stage shown in FIG. 10a,5 (dotted line), the charge packet 42 is shifted again one position to the left. The "empty" potential well 47 below the clock electrode 15 is not yet filled in this stage by the next signal packet 43, but is used in the same manner as the "empty" tank 46 for the generation of smear charge. A dotted line in FIG. 10a,6 indicates how this smear charge is shifted to the left as a separate packet. In a next stage not shown any more in FIG. 10a, the signal packet 43 can also be added to the charge transport.

Figure 10B:
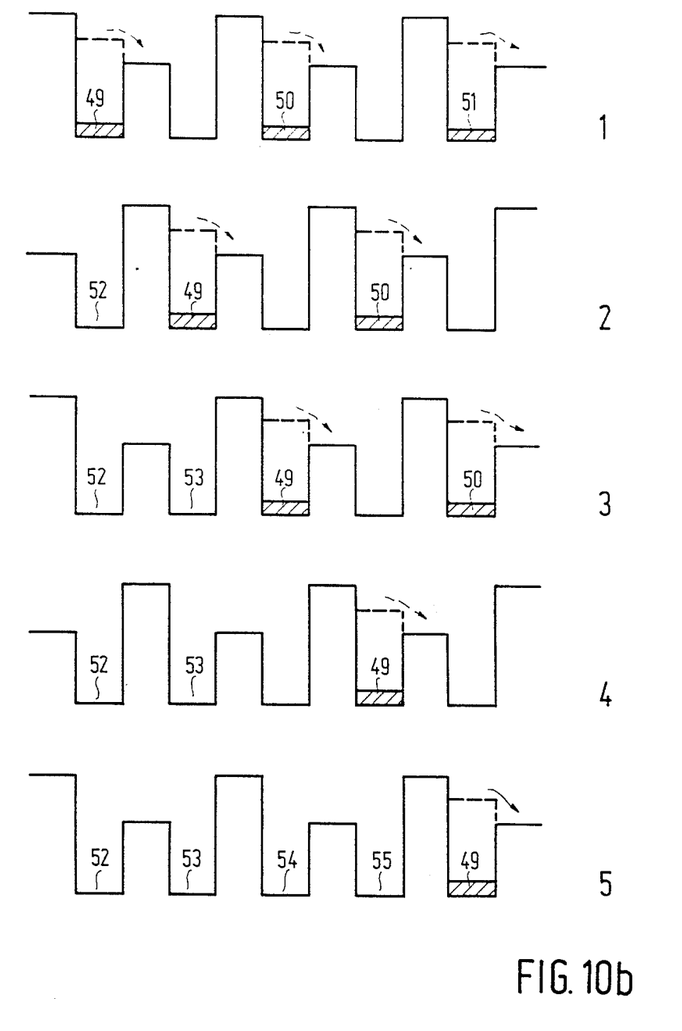
Figure 11B:
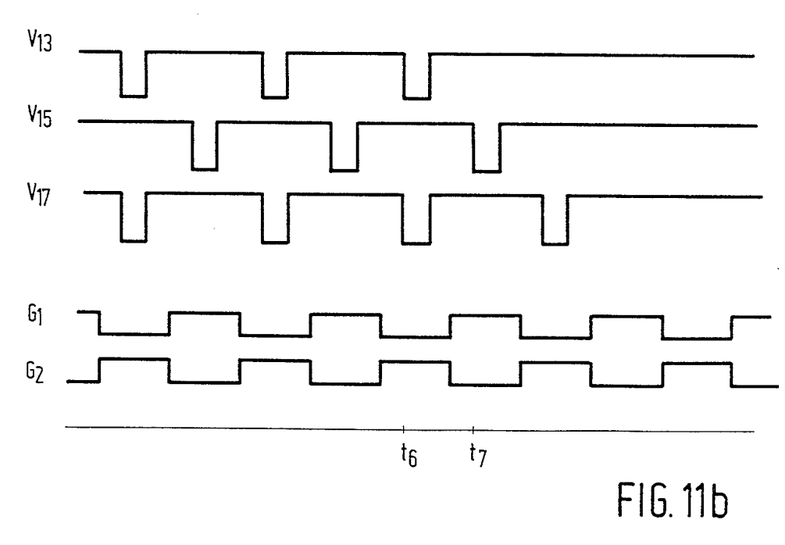

In this manner, the signal packet can successively be added to the charge transport, while between two successive signal charges each time a smear charge is generated as reference signal. The direction of the charge transport is entirely determined by the signals $G_1$ and $G_2$. This fact can be utilized to remove via the drain zone 38 (FIG. 7) the smear charge which has formed in the storage section when all signal charges have been transported to the storage section. To illustrate this, FIG. 10,b shows a number of potential diagrams during the removal of these residual charges. FIG. 11b shows the associated clock voltages.

FIG. 10b,1 shows the situation in which all signal charges have been stored in the storage section and in which only smear charges 49,50,51 are stored in the sensor section in potential wells below the electrodes 13,17 etc. This situation is indicated by a full line and corresponds to the high voltage level at these electrodes. At $t_6$ (FIG. 11b), $V_{13}$, $V_{17}$ etc. pass to the low level, as a result of which the potential below the electrodes 13,17 . . . passes to the level indicated by the dotted line in FIG. 10b,1. Due to the fact that at the same time $G_1$ is low and $G_2$ is high, as a result of which the potential barrier below, for example, the electrode 12 is high and below the electrode 14 is low, the charge 49 will be shifted to the right. At the same time, the packets 50 and 51 are also transported to the right, i.e. in the direction of the drain zone 38 (FIG. 7). When the charge has been transferred, $V_{13}, V_{17}$ etc. return to the high level. As appears from FIG. 11b, $V_{13}$ further remains high. At $t_7$, $V_{15}$ . . . passes to the low level, while $G_1$ and $G_2$ are high and low, respectively. The charges 49 and 50 are again shifted one position to the right, as indicated by broken lines in FIG. 10b,2. Due to the fact that at the same time the accordion is compressed on the lefthand side because the input IM of the shift register 32 does not vary any longer, no charge is transferred any more in the potential well 52 below the electrode 13. FIG. 10b,3 indicates by broken lines how the charges 49,50 are again shifted on by one position. Due to the fact that during this transport the potential 52 below the electrode 13 does not vary any longer, no smear charge is collected in the potential well 53 below the electrode 15. In an analogous manner, FIGS. 10b,4 and 10b,5 indicate how the packet 49 is transported further to the right, while the preceding potential wells 52,53, 54,55 below the electrodes 13,15,17 etc. remain empty due to the fact that the voltage at these electrodes does not vary any longer, as appears from FIG. 11b. After the packet 49 has been transported entirely through the sensor section, it can be drained via the drain zone 38 and again an image can be converted by the sensor section into a pattern of signal charges.

Figure 12:
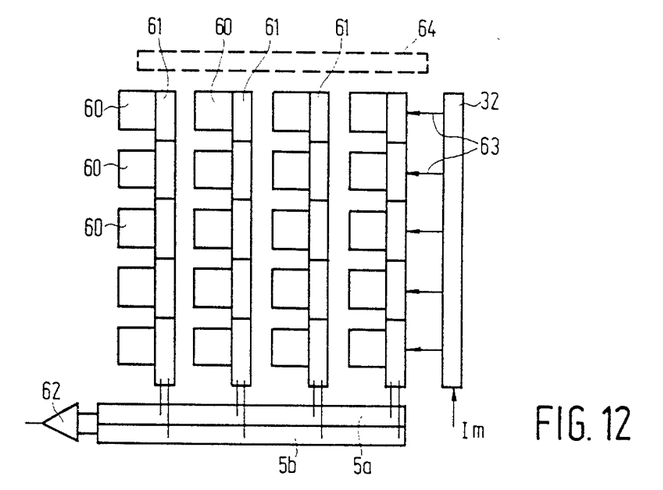
FIG. 12 shows the circuit diagram of a charge-coupled image sensor arrangement of the interline type.

The embodiments described hitherto all related to a charge-coupled image sensor arrangement of the frame transfer (FT) type. However, the invention may advantageously be used in all other known charge-coupled image sensor arrangements in which image blurring occurs due to the smear effect described. In order to illustrate this, FIG. 12 shows the circuit diagram of a charge-coupled image sensor arrangement of the interline type. For the sake of simplicity, FIG. 12 shows a matrix of only 4×5 elements, but it will be appreciated without further explanation that in practical embodiments the number of elements will be considerably larger in both directions. The sensor comprises a bidimensional pattern of photosensitive elements 60 arranged according to a system of rows and columns. In these elements photocurrent is produced proportionally to the local radiation intensity and is integrated during the integration period. Vertical read-out registers 61 in the form of charge-coupled devices are arranged between the columns. For the sake of clarity, only the transport channels of the charge-coupled devices 60 are shown and the clock electrodes are omitted. Below the matrix is arranged the horizontal read-out register 5 comprising an output amplifier 62, in which the signals can be derived. On the righthand side of the matrix is arranged a first register 32, by means of which the CCD registers 61 can be driven according to one of the accordion modes described above. The drive of the clock electrodes by the shift register 32 is indicated symbolically by the arrows 63.

The pitch between the photosensitive elements (pixels) 60 can be chosen so that in the known interlacing mode two pixels occur per bit of the channel 61. If therefore the registers 61 are operated as 4-phase CCD's during the transport, one pixel 60 corresponds to two clock electrodes. However, in the case in which, for example, a high vertical resolution is required, the pixel density can be doubled due to the accordion principle, according to which therefore each pixel corresponds to only one electrode and a signal charge can be stored at every other electrode.

During operation, at the end of an integration period the whole or half the pattern of signal packets is transported in the charge-coupled devices. Subsequently, the lowermost line is introduced into the read-out register 5b, while the remaining lines do not change their places. Before the next line is shifted, an "empty" potential well is first induced in the same manner as described above at the location at which the lowermost image line was stored, which potential well is transferred to the read-out register 5a, smear charge then being collected, which is used as reference during reading. The charge packets of the image line and the reference charges are transported to the left through the registers 5a and 5b, respectively, and can be read out there differentially. Meanwhile, the next image line can be transported in the registers 61 downwards in the direction of the read-out register 5 followed by a new line of reference signals. These lines can be introduced into the registers 5 after the last signal of the preceding line has been read.

In an analogous manner, the whole matrix can be read out, a line of reference signals being generated each time between two successive image lines stored in the registers 61.

In the same manner as in the preceding embodiment, the smear charge which is collected during the transport of the uppermost image line in the "empty" lines behind the last image line and is therefore present already before the signal charges are transferred to the registers 61 can also be removed. For example, on the upper side of the matrix a drain zone 64 (indicated in the Figure by broken lines) may be provided. By reversal of the transport direction, for example in the same manner as in the preceding embodiment, the said charge can be drained via the drain zone 64 before the signal charges are stored in the registers 61.

In the embodiment shown in FIG. 1, with each line of image signals a corresponding line of smear charges is formed. These lines of reference charges are stored in the storage between the lines of image signals. This means that the storage capacity of the storage has to be doubled with respect to conventional arrangements without smear compensation. In practice, this means a considerable enlargement of the semiconductor surface area required.

In many cases, for example when less stringent requirements are imposed on the smear compensation, it is sufficient to form a reference line for a number of image signal lines. This is shown diagrammatically in FIG. 13. In this drawing, again the sensor section 3, the storage section 4 and the series output registers 5,5' are represented. The sensor section comprises a number of image signal lines which are numbered groupwise, i.e. as the lines 6,7,8; 76,77,78; 86,87,88, each group therefore comprising, by way of example, three lines. During the transport, one reference line of smear charges is formed only per group of three image signal lines. In the storage section 4, besides the image signal lines also the reference charge lines 70,71,72 are stored, where the line 70 serves as the reference line for the image signal lines 6, 7 and 8; the line 71 serves as the reference for the image signal lines 76,77,78, and the line 72 serves as the reference line for the image signal lines 86,87 and 88.

Figure 13:
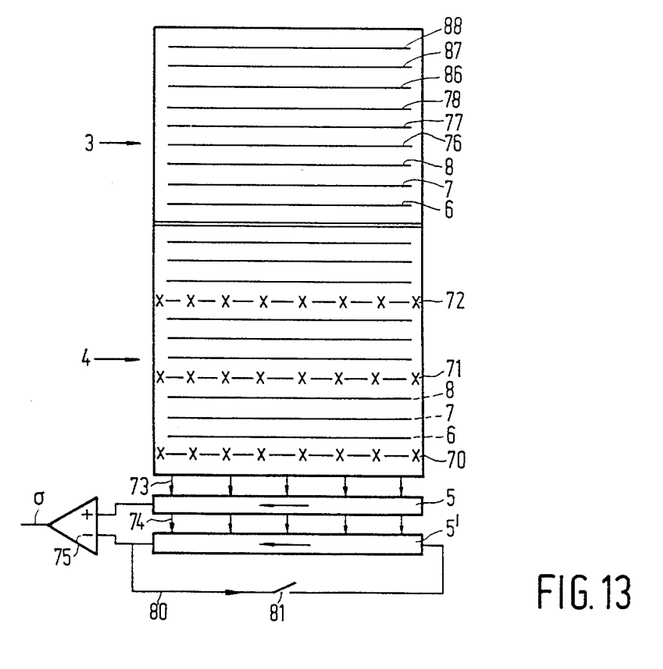
FIG. 13 shows the circuit diagram of a further embodiment of an FT sensor according to the invention.

It should be noted that in this embodiment only three reference charge lines are required for the nine image signal lines shown, which means that the enlargement of the storage section 4 has been reduced to about one third as compared with embodiments in which one reference line is formed for each image signal line. As a matter of course, it is possible in a number of cases to use only one reference line for, for example, five or even a larger number of image signal lines, for example ten image signal lines, in which event an even more substantial reduction of the semiconductor surface area required can be obtained.

The image signal lines and the reference lines can again be read out differentially by means of the horizontal read-out registers 5 and 5'. For this purpose, the line 70 is first transferred through the register 5 to the lowermost register 5' (symbolically indicated by the arrows 73,74). The first image line 6 can be transferred in the register 5, after which the signals in the registers 5 and 5' are transported synchronously to the differential output amplifier 75. The image signals can be derived at the output 0 of the amplifier 75. Since the reference line 70 is also used for the image signal lines 7 and 8, the signals of the line 70 should be stored in a storage. For this purpose, for example, the register 5' itself may be used in that in known manner the reference signals are introduced again at the other end of the register 5' via the feedback circuit 80 and the closed switch 81. The register 5' is then filled again by the reference line 70 when the line 6 has been read out and the next image signal line 7 is transferred in the register 5. This process is repeated on behalf of the image signal line 8. When this line 8 is read out, the register 5' can be emptied, for example by opening the switch 81, as a result of which the reference charges are no longer introduced and the register 5' is made ready for storing the next reference line 71.

It will be appreciated that the invention is not limited to the embodiments shown here, but that many further variations are possible for those skilled in the art without departing from the scope of the invention. For example, the invention may also be used in the known charge-coupled devices of the line transfer type.

Alternatively, the arrangement may be operated during the integration period as an m-phase CCD, a pixel corresponding to m electrodes, while it may be operated during the transport period as an n-phase CCD, a pixel corresponding to n electrodes (n integer and smaller than m), by compressing the pixels at the end of the integration period and immediately before the transport in such a manner that p pixels in the integration period correspond to (p+1) pixels during the transport. The additional pixel during the transport may then be used as reference for the smear charge. In a practical embodiment, a pixel may correspond in the integration period to 4 electrodes (4-phase CCD) so that 3 pixels are present for every 12 electrodes. After the integration period, these pixels are compressed in such a manner that now each pixel corresponds to 3 electrodes. The said 12 electrodes can then comprise $3+1=4$ pixels, the fourth pixel not comprising signal charge, but only comprising smear plus leak charge.

What is claimed is:

1. A CCD image sensor and charge transport arrangement having a semiconductor body comprising a charge-coupled device having a charge transport channel through which there is transported between two successive signal charge packets which are representative of the local intensity of a line of a trapped image a reference charge packet which is representative of a line of the overall smear charge and dark-current charge and which is collected during the said charge transport, characterized in that means are provided with the aid of which    (a) only one reference charge packet is formed for a number P of image signal packets, where P>2, storage means are provided which are utilized to store the associated reference packet during the read out of the P associated image signal charge packets,    (b) there are induced before the said charge transport in a channel two potential wells which are separated from each other by a potential barrier and in which the two said signal charge packets are stored,    (c) then at the beginning of the charge transport the distance between the signal charge packets is enlarged by displacing at least one of these signal charge packets, and    (d) there is induced between these signal charge packets, a third potential well which is also transported during the charge transport, the reference charge packet then being formed.

2. A CCD image sensor arrangement as claimed in claim 1, characterized in that the said means are such that the distance between the two signal charge packets at the beginning of the said charge transport is enlarged by displacing, viewed in the direction of the charge transport, the foremost signal charge packet of the two said signal charge packets, while the hindmost signal charge packet does not change its place.

3. A CCD image sensor arrangement as claimed in claim 2, characterized in that, after the third potential well has been formed, the charge forming in the potential well, which is designated hereinafter as reference charge packet, is displaced in the direction of the charge transport, as a result of which the distance between the reference charge packet and the hindmost signal charge packet is enlarged, before the hindmost signal charge packet is displaced.

4. A CCD image sensor arrangement as claimed in any one of the preceding claims, characterized in that further means are provided, with the aid of which, after all signal charges have been removed from the charge-coupled device or a part thereof, the remaining charges due to leakage current and/or smear collected in this part are drained before signal charges of the next frame are collected in the charge-coupled device.

5. A CCD image sensor arrangement as claimed in claim 1, characterized in that the charge-coupled device is of the type which is operated during the storage of signal charges as an m-phase device and is operated during the charge transport as an n-phase device, n being larger than m, while during the transport, in order to avoid mixing of charge packets, in a series of charge packets a charge packet always participates in the transport later than the preceding charge packet, that is to say only then when its distance from the preceding charge packet is sufficiently large, this distance between at least two successive signal charges being made so large that between these signal charges the said third potential well can be induced, in which the reference charge is formed, and in that the distance between the foremost signal charge and the reference charge and between the reference charge and the following signal charge has first to be made sufficiently large before the last-mentioned signal charge is transported.

6. A CCD image sensor arrangement as claimed in claim 5, characterized in that the charge-coupled device comprises a storage section which is shielded against incident radiation and in which the signal and reference charges can be stored before they are read out, while the storage section can be operated during the transport as an n-phase device and can be operated during the storage as an m-phase device.

7. A CCD image sensor arrangement as claimed in claim 1, characterized in that the sensor arrangement is of the frame transfer type comprising a system of adjacent parallel charge-coupled devices, which comprises an image sensor section for converting an image projected onto it into a pattern of charge packets and a storage section for storing the said pattern of charge packets plus the said reference charge packets.

8. A CCD image sensor arrangement as claimed in claim 4, characterized in that, after the signal charge is entirely transported from the sensor section, the direction of the charge transport can be reversed in the sensor section, as a result of which smear charge still present can be drained.

9. A CCD image sensor arrangement as claimed in claim 4, characterized in that, after the signal charge has been transported entirely from the sensor section, such a voltage can be applied to the electrodes of the sensor section that charge still present in the sensor section can be drained through the semiconductor body.

10. A camera comprising a CCD image sensor arrangement as claimed in claim 1.

11. A CCD image sensor and charge transport arrangement having a semiconductor body comprising a charge-coupled device having a charge transport channel through which there is transported between two successive signal charge packets which are representative of the local intensity of a trapped image a reference charge packet which is representative of the overall smear charge and dark-current charge and which is collected during the said charge transport, characterized in that means are provided with the aid of which    (a) there are induced before the said charge transport in a channel two potential wells which are separated from each other by a potential barrier and in which the two said signal charge packets are stored,    (b) the distance between the two signal charge packets at the beginning of the said charge transport is enlarged by displacing, viewed in the direction of the charge transport, the foremost signal charge packet of the two said signal charge packets, while the hindmost signal charge packets does not change its place,    (c) there is induced between these signal charge packets a third potential well which is also transported during the charge transport, the reference charge packet then being formed.

12. A CCD image sensor arrangement as claimed in claim 11, characterized in that, after the third potential well has been formed, the charge forming in the potential well, which is designated hereinafter as reference charge packet, is displaced in the direction of the charge transport, as a result of which the distance between the reference charge packet and the hindmost signal charge packet is enlarged, before the hindmost signal charge packet is displaced.

13. A CCD image sensor arrangement as claimed in claim 11, characterized in that further means are provided, with the aid of which, after all signal charges have been removed from the charge-coupled device or a part thereof, the remaining charges due to leakage current and/or smear collected in this part are drained before signal charges of the next frame are collected in the charge-coupled device.

14. A CCD image sensor arrangement as claimed in claim 11, characterized in that the charge-coupled device is of the type which is operated during the storage of signal charges as an m-phase device and is operated during the charge transport as an n-phase device, n being larger than m, while during the transport, in order to avoid mixing of charge packets, in a series of charge packets a charge packet always participates in the transport later than the preceding charge packets, only then when its distance from the preceding charge packets is sufficiently large, this distance between at least two successive signal charges being made so large that between these signal charges the said third potential well can be induced, in which the reference charge is formed, and in that the distance between the foremost signal charge and the reference charge and between the reference charge and the following signal charge has first to be made sufficiently large before the last-mentioned signal charge is transported.

15. A CCD image sensor arrangement as claimed in claim 14, characterized in that the charge-coupled device comprises a storage section which is shielded against incident radiation and in which the signal and reference charges can be stored before they are read out, while the storage section can be operated during the transport as an n-phase device and can be operated during the storage as an m-phase device.

16. A CCD image sensor arrangement as claimed in claim 11, characterized in that the sensor arrangement is of the frame transfer type comprising a system of adjacent parallel charge-coupled devices, which comprises an image sensor section for converting an image projected onto it into a pattern of charge packets an a storage section for storing the said pattern of charge packets plus the said reference charge packets.

17. A CCD image sensor arrangement as claimed in claim 14, characterized in that the storage section has a number of charge locations which is about twice the number of these locations in the image sensor section, while a line of reference charge packets can be stored between each pair of lines of signal charge packets.

18. A CCD image sensor arrangement as claimed in claim 11, characterized in that only one reference line is formed for a number of p image signal lines, where $p \geq 2$, storage means being provided with the aid of which during the read-out of each group of p-lines the associated line of reference charges can be stored.

19. A CCD image sensor arrangement as claimed in claim 13, characterized in that, after the signal charge is entirely transported from the sensor section, the direction of the charge transport can be reversed in the sensor section, as a result of which any smear charge still present can be drained.

20. A CCD image sensor arrangement as claimed in claim 13, characterized in that, after the signal charge has been transported entirely from the sensor section, such a voltage can be applied to the electrodes of the sensor section that charge still present in the sensor section can be drained through the semiconductor body.

21. A camera comprising a CCD image sensor arrangement as claimed in claim 11.

* * * * *